Oct. 16, 1945.  R. F. LEDOUX  2,386,806
REPRODUCTION METHOD
Filed Oct. 1, 1942
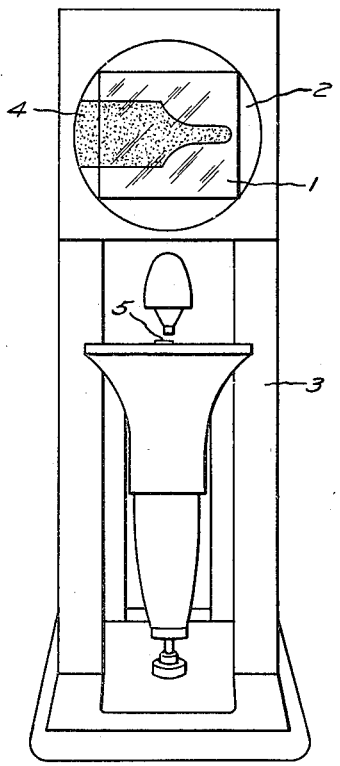
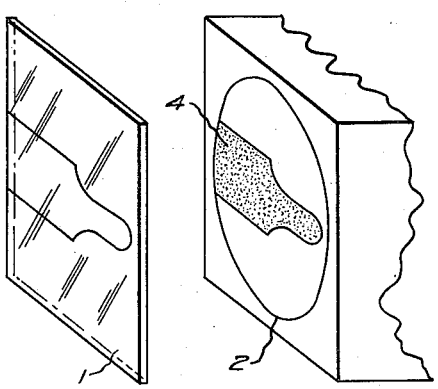
Inventor
ROBERT F. LEDOUX,
By G. J. Kessenich & H. E. Thibodeau
Attorneys Patented Oct. 16, 1945

2,386,806

UNITED STATES PATENT OFFICE 2,386,806

REPRODUCTION METHOD

Robert F. Ledoux, Springfield, Mass.

Application October 1, 1942, Serial No. 460,346

1 Claim. (Cl. 88—24)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method for reproducing contour lay-outs of small machined components on a non-shrinking, non-expanding material for comparing the projected image of the component with the contour lay-out.

Inspection of nearly all small manufactured components by the use of gauges is not altogether satisfactory because of the small size and odd shape of certain components. Even with gauges it is oftentimes difficult for the inspector to determine whether the component conforms to required dimensions. Furthermore gauge inspection necessarily checks only the most significant dimensions. Another drawback to the inspection of small components by the use of gauges is the high cost of these gauges.

A highly satisfactory method for checking any such small component without the use of gauges has however been evolved. This method consists of comparing an enlarged carefully drawn contour lay-out of the component with a projected image of the component enlarged to the same scale. In this manner the component can be readily checked with a master lay-out to determine whether any discrepancies exist in the manufactured component by direct comparison. As both the lay-out and the projected image are produced at a greatly enlarged scale the comparison can be rapidly made with a high degree of accuracy.

This procedure is conveniently accomplished on a projection comparator. When the component is placed on the comparator the image of the component may be projected onto the screen of the comparator to any desired enlargement. However, when comparing the component with the contour lay-out the image of the component must be projected onto the screen at exactly the same scale as that of the contour lay-out. The lay-out is then placed over the image of the component and the contour of the projected image compared with the lay-out. It is thus readily seen that a very accurate comparison can be made.

The main drawback with this procedure however has been that the medium on which the contour lay-outs are drawn is subject to dimensional changes due to humidity and temperature variations of the atmosphere. It is readily apparent that any slight dimensional change of the contour lay-out due to shrinkage or expansion of the medium on which the lay-out is made results in distortion of the true drawing and a comparison with the component will be worthless.

Accordingly it is an object of this invention to provide a method for reproduction of accurately drawn contour lay-outs of small components that is not subject to dimensional changes due to variations in atmospheric conditions.

The specific nature of the invention as well as other objects and advantages thereof will clearly appear from a description of a preferred embodiment as shown in the accompanying drawing in which:

Fig. 1 is a front elevational view of a projection comparator showing the enlarged image of a component on the viewing screen of such comparator and the master contour on a glass plate superimposed on such image.

Fig. 2 is a perspective view showing the viewing screen of a comparator with an enlarged image of a component thereon and a glass plate, having a master contour thereon of the same size as the enlarged image, about to be superimposed on such image for comparison of the enlarged contour of the component with the master contour.

Another object of this invention is to provide a contour reproduction medium that is convenient and inexpensive to use.

In the past contour lay-out drawings have been made on tracing cloth. When subjected to much handling these tracings quickly became soiled and were soon unfit for use. Furthermore tracing cloth is greatly affected by variations in atmospheric conditions and is therefore subject to dimensional changes.

It is well known that reproduction of drawings can be readily and conveniently reproduced by the medium of photography. Accordingly a direct contact print from a contour lay-out tracing (not shown) was made on a sensitized glass photographic plate. A glass plate was used instead of photographic film because the latter is subject to dimensional changes due to varying atmospheric conditions whereas the former is relatively unaffected.

From the negative thus made a direct positive contact plate 1 is made. Such plate is then placed on a screen 2 as shown in Figs. 1 and 2 of a projection comparator 3 and compared with a projected image 4 as shown in Figs. 1 and 2 of a component 5. Repeated trials and careful scientific measurements under greatly varying conditions of temperature and humidity indicate that the reproduction of these contour lay-outs on photographic glass plates is highly satisfactory because the dimensional changes of this material are so small that they can be readily ignored. It is important however that such a glass plate negative be made from the contour lay-out tracing very shortly after the tracing is completed and before the tracing changes dimensionally.

Thus it is readily apparent that accurate reproduction of contour lay-out drawings can be readily made on photographic glass plates and that these plates have no appreciable dimensional changes regardless of atmospheric conditions. A further advantage of this process is found in the ease, convenience and low cost with which duplicate positive plates are made. In the event that any of the positives are destroyed another may be readily made from the master negative on file thus obviating the necessity of the laborious procedure of making a new contour lay-out drawing.

I claim:

The method of optical contour comparison consisting of, producing from a contour layout drawing a direct contact print on a sensitized photographic medium which is not subject to dimensional changes, making from the negative thus produced a direct positive contact reproduction on a transparent glass plate, projecting on a screen a light image derived from the contour to be tested, and then placing said glass plate over said image so as to compare the photographic reproduction therewith.

ROBERT F. LEDOUX.